(12) United States Patent
Ohmori et al.

(10) Patent No.: US 11,133,514 B2
(45) Date of Patent: Sep. 28, 2021

(54) RESIN FRAME EQUIPPED MEMBRANE ELECTRODE ASSEMBLY AND METHOD OF PRODUCING THE SAME

(71) Applicant: HONDA MOTOR CO., LTD., Tokyo (JP)

(72) Inventors: Suguru Ohmori, Wako (JP); Yutaka Ebato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/860,105

(22) Filed: Apr. 28, 2020

(65) Prior Publication Data

US 2020/0259190 A1 Aug. 13, 2020

Related U.S. Application Data

(62) Division of application No. 15/831,533, filed on Dec. 5, 2017, now abandoned.

(30) Foreign Application Priority Data

Dec. 8, 2016 (JP) .............................. JP2016-238130

(51) Int. Cl.
*H01M 8/0273* (2016.01)
*H01M 4/92* (2006.01)
(Continued)

(52) U.S. Cl.
CPC ......... *H01M 8/0273* (2013.01); *H01M 4/921* (2013.01); *H01M 4/926* (2013.01); *H01M 8/1004* (2013.01); *H01M 8/1039* (2013.01); *B32B 7/12* (2013.01); *B32B 27/08* (2013.01); *B32B 37/10* (2013.01);
(Continued)

(58) Field of Classification Search
CPC .................................................. H01M 8/0273
See application file for complete search history.

(56) References Cited

U.S. PATENT DOCUMENTS

| 2005/0014056 A1 | 1/2005 | Zuber et al. |
| 2007/0184326 A1 | 8/2007 | Sompalli et al. |

(Continued)

FOREIGN PATENT DOCUMENTS

| JP | 2008-130433 | 6/2008 |
| JP | 2017-174650 | 9/2017 |

OTHER PUBLICATIONS

Non-Final Office Action for U.S. Appl. No. 15/831,533 dated Jun. 7, 2019.
(Continued)

*Primary Examiner* — Brian R Ohara
(74) *Attorney, Agent, or Firm* — Amin, Turocy & Watson, LLP (57) ABSTRACT

A resin frame equipped membrane electrode assembly includes a membrane electrode assembly and a resin frame member around an outer peripheral portion of the membrane electrode assembly. An inner end of the resin frame member is joined to an electrolyte membrane. In the state before the inner end is joined to the electrolyte membrane, the inner end is narrowed inward in a manner that a surface of the inner end adjacent to the electrolyte membrane gets closer to a surface of the inner end opposite to the electrolyte membrane.

6 Claims, 7 Drawing Sheets

(51) Int. Cl.
*H01M 8/1004* (2016.01)
*H01M 8/1039* (2016.01)
*B32B 7/12* (2006.01)
*H01M 8/1018* (2016.01)
*B32B 37/08* (2006.01)
*B32B 37/10* (2006.01)
*B32B 27/08* (2006.01)

(52) U.S. Cl.
CPC . *B32B 2457/18* (2013.01); *H01M 2008/1095* (2013.01); *Y02P 70/50* (2015.11)

(56) References Cited

U.S. PATENT DOCUMENTS

2010/0062320 A1* 3/2010 Dammar ............. H01M 8/0276
429/480
2010/0112405 A1* 5/2010 Peters ................. H01M 8/0276
429/513
2011/0318667 A1* 12/2011 Miller ................. H01M 8/0273
429/481

OTHER PUBLICATIONS

Final Office Action for U.S. Appl. No. 15/831,533 dated Sep. 24, 2019.
Non-Final Office Action for U.S. Appl. No. 15/831,533 dated Feb. 11, 2020.
U.S. Appl. No. 15/831,533, filed Dec. 5, 2017.

* cited by examiner

RESIN FRAME EQUIPPED MEMBRANE ELECTRODE ASSEMBLY AND METHOD OF PRODUCING THE SAME

CROSS-REFERENCE TO RELATED APPLICATIONS

This application is a Divisional of application Ser. No. 15/831,533 filed on Dec. 5, 2017, the contents of which are incorporated herein by reference.

This application is based upon and claims the benefit of priority from Japanese Patent Application No. 2016-238130 filed on Dec. 8, 2016, the contents of which are incorporated herein by reference.

BACKGROUND OF THE INVENTION

Field of the Invention

The present invention relates to a resin frame equipped membrane electrode assembly and a method of producing the resin frame equipped membrane electrode assembly.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode is provided on one surface of the solid polymer electrolyte membrane, and a cathode is provided on the other surface of the solid polymer electrolyte membrane.

The membrane electrode assembly is sandwiched between separators (bipolar plates) to form a power generation cell (unit cell). A predetermined number of the power generation cells are stacked together to form a fuel cell stack. In use, for example, the fuel cell stack is mounted in a vehicle as an in-vehicle fuel cell stack.

In recent years, in an attempt to reduce the quantity of the relatively expensive solid polymer electrolyte membrane, and protect the thin solid polymer electrolyte membrane having the low strength, a resin frame equipped MEA including a resin frame member in its outer periphery has been adopted (see Japanese Laid-Open Patent Publication No. 2008-130433).

SUMMARY OF THE INVENTION

In the process of producing the resin frame equipped MEA, the membrane electrode assembly and the resin frame member are joined together integrally by hot pressing. Specifically, an inner end of the resin frame member is placed between outer peripheral portions of the anode and the cathode in a manner that the electrolyte membrane and the inner end of the resin frame member are overlapped with each other. Then, the membrane electrode assembly and the resin frame member are joined together by applying heat and a load to an outer peripheral portion of the membrane electrode assembly and an inner peripheral portion of the resin frame member by hot pressing. In this case, by the surface pressure when the load is applied, the electrolyte membrane may be stuck by corners of the inner end, and the electrolyte membrane may be damaged undesirably.

The present invention has been made taking the problem into account, and an object of the present invention is to provide a resin frame equipped membrane electrode assembly and a method of producing the resin frame equipped membrane electrode assembly in which it is possible to suppress damage of the electrolyte membrane assembly by the inner end of the resin frame member as much as possible when the membrane electrode assembly and a resin frame member are joined together.

In order to achieve the above object, in the present invention, a resin frame equipped membrane electrode assembly includes a membrane electrode assembly including a first electrode on one surface of an electrolyte membrane, and a second electrode on another surface of the electrolyte membrane, and a resin frame member provided on and around an outer peripheral portion of the membrane electrode assembly. An inner end of the resin frame member is placed between an outer peripheral portion of the first electrode and an outer peripheral portion of the second electrode and joined to the electrolyte membrane. In a state before the inner end is joined to the electrolyte membrane, the inner end is narrowed inward in a manner that a surface of the inner end adjacent to the electrolyte membrane gets closer to a surface of the inner end opposite to the electrolyte membrane.

In the above resin frame equipped membrane electrode assembly, preferably, the inner end is joined to the electrolyte membrane through an adhesive layer.

In the above resin frame equipped membrane electrode assembly, preferably, in the first electrode and the second electrode, a surface size of one electrode is larger than a surface size of another electrode, and the inner end is joined to the electrolyte membrane which is integral with the other electrode through the adhesive layer.

In the above resin frame equipped membrane electrode assembly, preferably, the one electrode has an inclined area inclined from the electrolyte membrane at a position overlapped with the inner end of the resin frame member, and the other electrode has a flat shape from an area outside the inner end to an area inside the inner end.

In the above resin frame equipped membrane electrode assembly, preferably, the one electrode includes a catalyst layer on a surface of the one electrode facing the other electrode, and an inner peripheral portion of the resin frame member opposite to the electrolyte membrane directly contacts the catalyst layer.

Further, the present invention provides a method of producing a resin frame equipped membrane electrode assembly. The resin frame equipped membrane electrode assembly includes a membrane electrode assembly including a first electrode on one surface of an electrolyte membrane, and a second electrode on another surface of the electrolyte membrane, and a resin frame member provided on and around an outer peripheral portion of the membrane electrode assembly. The method includes the step of placing an inner end of the resin frame member between an outer peripheral portion of the first electrode and an outer peripheral portion of the second electrode. The inner end is narrowed inward in a manner that a surface of the inner end adjacent to the electrolyte membrane gets closer to a surface of the inner end opposite to the electrolyte membrane. Further, the method includes the step of joining the inner end and the electrolyte membrane together, by applying heat and a load to the inner end placed between the outer peripheral portion of the first electrode and the outer peripheral portion of the second electrode.

In the above method of producing the resin frame equipped membrane electrode assembly, preferably, in the joining step, the inner end is joined to the electrolyte membrane through an adhesive layer.

In the above method of producing the membrane electrode assembly, preferably, in the first electrode and the second electrode, a surface size of one electrode is larger than a surface size of another electrode, and in the joining step, the inner end is joined to the electrolyte membrane which is integral with the other electrode, through the adhesive layer.

In the above method of producing the resin frame equipped membrane electrode assembly, preferably, in a state where the joining step is finished, the one electrode has an inclined area inclined from the electrolyte membrane at a position overlapped with the inner end of the resin frame member, and the other electrode has a flat shape from an area outside the inner end to an area inside the inner end.

In the resin frame equipped membrane electrode assembly and the method of producing the resin frame equipped assembly according to the present invention, in the state before the inner end of the resin frame member is joined to the electrolyte membrane, the inner end is narrowed inward in a manner that a surface of the inner end gets closer to a surface of the inner end opposite to the electrolyte membrane. In the structure, even if the surface pressure is applied at the time of applying a load for joining the components together, the inner end of the resin frame member is not stuck into the electrolyte membrane. Therefore, at the time of joining the membrane electrode assembly and the resin frame member together, it is possible to suppress damage of the electrolyte membrane by the inner end of the resin frame member as much as possible.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
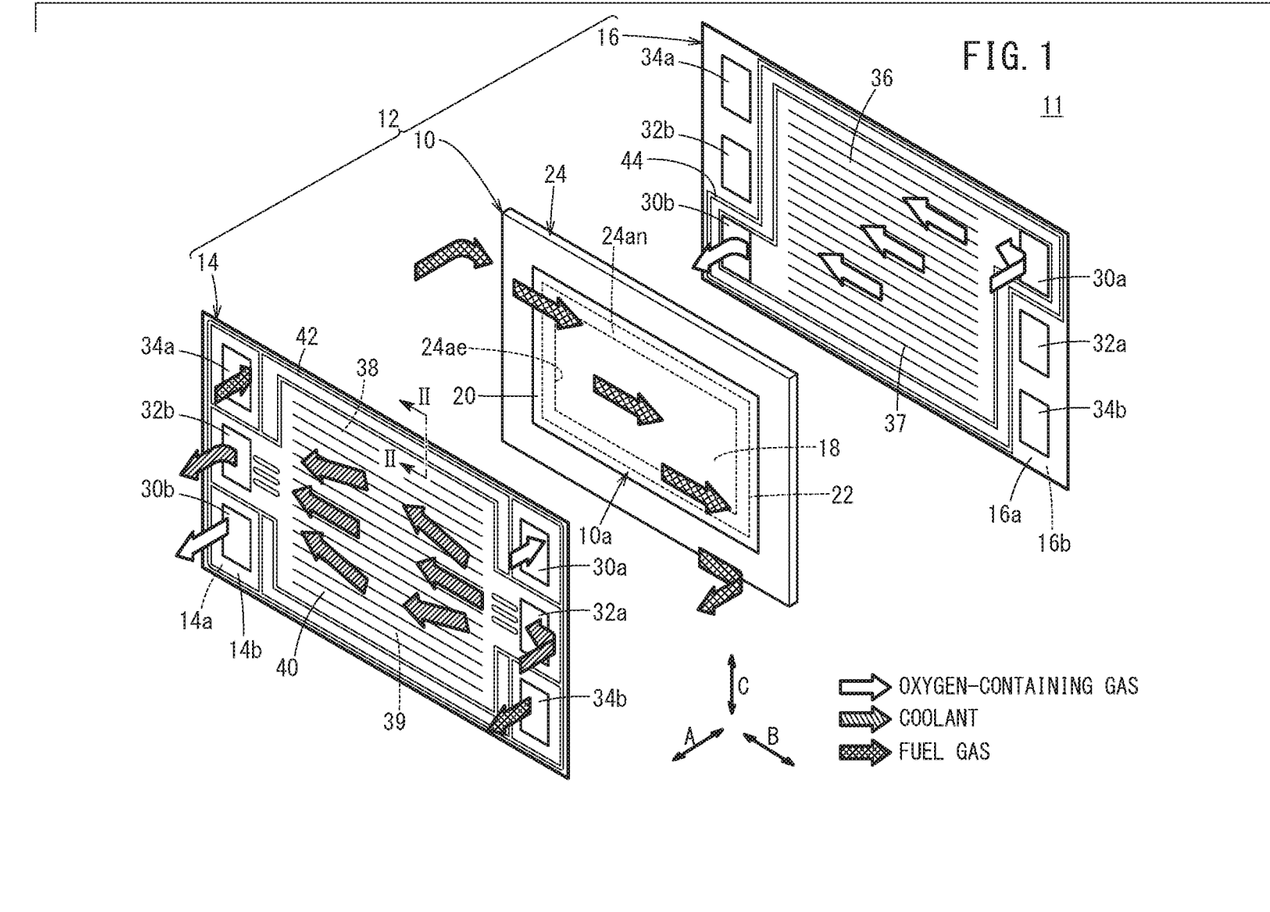
FIG. 1 is an exploded perspective view showing main components of a power generation cell including a resin frame equipped membrane electrode assembly according to a first embodiment of the present invention.
Figure 2:
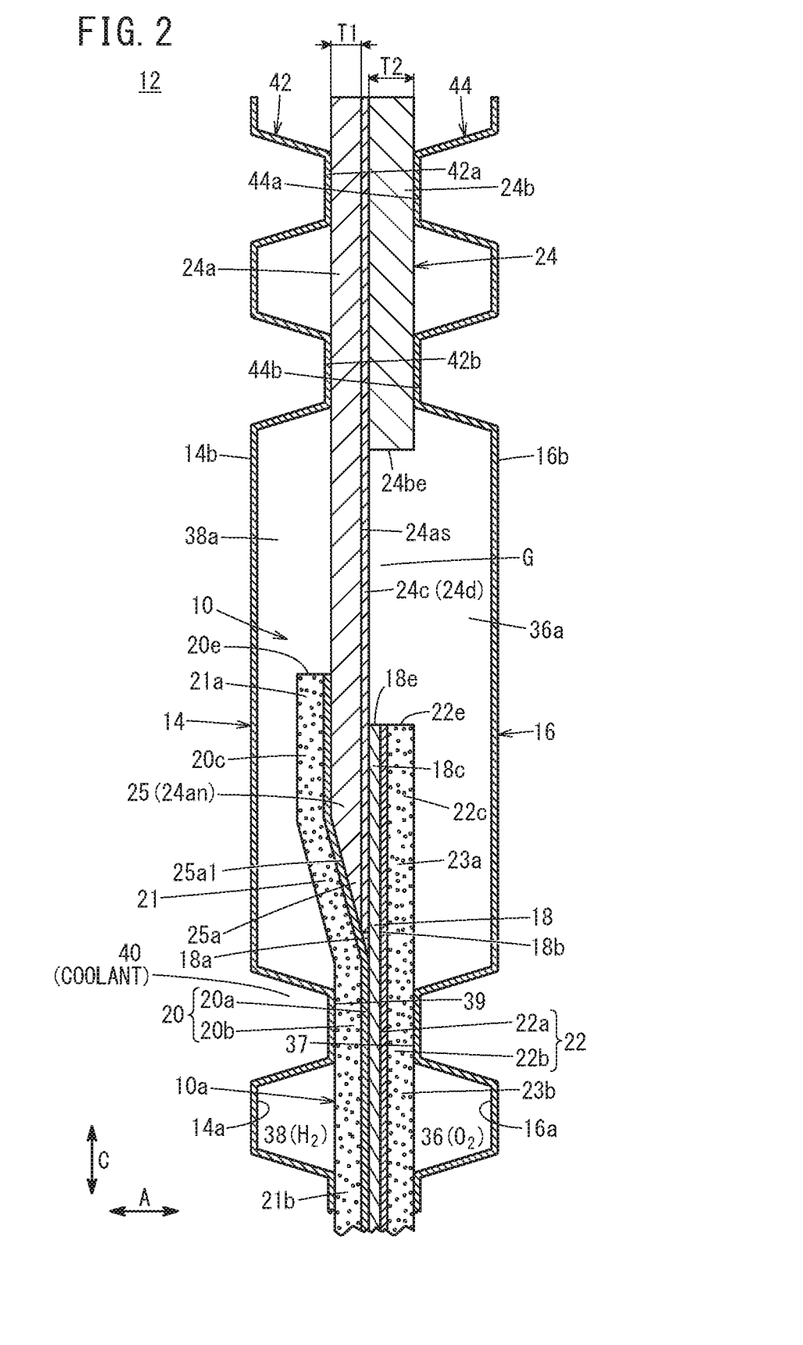
FIG. 2 is a cross sectional view taken along a line II-II in FIG. 1.

As shown in FIGS. 1 and 2, a power generation cell (fuel cell) 12 includes a resin frame equipped membrane electrode assembly 10 (hereinafter referred to as the "resin frame equipped MEA 10"), and a first separator 14 and a second separator 16 provided on both sides of the resin frame equipped MEA 10. The power generation cell 12 is a laterally elongated (or longitudinally elongated) rectangular solid polymer fuel cell. A plurality of the power generation cells 12 are stacked together in a horizontal direction indicated by an arrow A or in a gravity direction indicated by an arrow C to form a fuel cell stack 11. For example, the fuel cell stack 11 is mounted as an in-vehicle fuel cell stack, in a fuel cell electric automobile (not shown).

The power generation cell 12 is formed by sandwiching the resin frame equipped MEA 10 between the first separator 14 and the second separator 16. Each of the first separator 14 and the second separator 16 has a laterally elongated (or longitudinally elongated) rectangular shape. For example, the first separator 14 and the second separator 16 are made of metal plates such as steel plates, stainless steel plates, aluminum plates, plated steel plates, or metal plates having anti-corrosive surfaces by surface treatment. Alternatively, carbon members may be used as the first separator 14 and the second separator 16.

The resin frame equipped MEA 10 includes a membrane electrode assembly 10a (hereinafter referred to as the "MEA 10a"), and a resin frame member 24 joined to an outer peripheral portion of the MEA 10a, around the outer peripheral portion of the MEA 10a. The MEA 10a includes an electrolyte membrane 18, an anode 20 (first electrode) provided on one surface of the electrolyte membrane 18, and a cathode (second electrode) 22 provided on another surface of the electrolyte membrane 18.

For example, the electrolyte membrane 18 is a solid polymer electrolyte membrane (cation ion exchange membrane). The solid polymer electrolyte membrane is formed by impregnating a thin membrane of perfluorosulfonic acid with water, for example. The electrolyte membrane 18 is interposed between the anode 20 and the cathode 22. A fluorine based electrolyte may be used as the electrolyte membrane 18. Alternatively, an HC (hydrocarbon) based electrolyte may be used as the electrolyte membrane 18.

The surface size (outer size) of the anode 20 is larger than the surface sizes (outer sizes) of the electrolyte membrane 18 and the cathode 22. Instead of adopting the above structure, the surface size of the anode 20 may be smaller than the surface sizes of the electrolyte membrane 18 and the cathode 22.

The anode 20 includes a first electrode catalyst layer 20a joined to one surface 18a of the electrolyte membrane 18 and a first gas diffusion layer 20b stacked on the first electrode catalyst layer 20a. The surface size of the first electrode catalyst layer 20a and the surface size of the first gas diffusion layer 20b are the same, and are larger than the surface sizes of the electrolyte membrane 18 and the cathode 22.

The cathode 22 includes a second electrode catalyst layer 22a joined to a surface 18b of the electrolyte membrane 18 and a second gas diffusion layer 22b stacked on the second electrode catalyst layer 22a. The second electrode catalyst layer 22a and the second gas diffusion layer 22b, and the electrolyte membrane 18 have the same surface size. Therefore, an outer end 22e of the cathode 22 and an outer end 18e of the electrolyte membrane 18 are at the same position in the surface direction of the electrolyte membrane 18 (in the direction indicated by an arrow C in FIG. 2).

The surface size of the cathode 22 is smaller than the surface size of the anode 20. The outer end 22e of the cathode 22 and the outer end 18e of the electrolyte membrane 18 are positioned inside an outer end 20e of the anode 20.

The surface size of the cathode 22 may be larger than the surface size of the anode 20, and the outer end 22e of the cathode 22 may be positioned outside the outer end 2e of the anode 20. Alternatively, the surface size of the anode 20 and the surface size of the cathode 22 may have the same surface size, and the outer end 20e of the anode 20 and the outer end 22e of the cathode 22 may be at the same position in the surface direction of the electrolyte membrane 18 (indicated by an arrow C in FIG. 2).

For example, the first electrode catalyst layer 20a is formed by porous carbon particles deposited uniformly on the surface of the first gas diffusion layer 20b together with an ion conductive polymer binder, while platinum alloy is supported on the porous carbon particles. For example, the second electrode catalyst layer 22a is formed by porous carbon particles deposited uniformly on the surface of the second gas diffusion layer 22b together with an ion conductive polymer binder, while platinum alloy is supported on the porous carbon particles.

Each of the first gas diffusion layer 20b and the second gas diffusion layer 22b comprises a carbon paper or a carbon cloth, etc. The surface size of the second gas diffusion layer 22b is smaller than the surface size of the first gas diffusion layer 20b. The first electrode catalyst layer 20a and the second electrode catalyst layer 22a are formed on both surfaces of the electrolyte membrane 18, respectively.

The resin frame member 24 includes two frame shaped sheets having different thicknesses. Specifically, the resin frame member 24 includes a first frame shaped sheet 24a including an inner peripheral portion 24an joined to an outer peripheral portion of the MEA 10a, and a second frame shaped sheet 24b joined to the first frame shaped sheet 24a. The first frame shaped sheet 24a and the second frame shaped sheet 24b are joined together in the thickness direction by an adhesive layer 24c made of adhesive 24d. The second frame shaped sheet 24b is joined to an outer peripheral portion of the first frame shaped sheet 24a. In the structure, the outer peripheral portion of the resin frame member 24 is thicker than the inner peripheral portion of the resin frame member 24.

The first frame shaped sheet 24a and the second frame shaped sheet 24b are made of resin material. Examples of materials of the first frame shaped sheet 24a and the second frame shaped sheet 24b include PPS (poly phenylene sulfide), PPA (polyphthalamide), PEN (polyethylene naphthalate), PES (polyethersulfone), LCP (liquid crystal polymer), PVDF (polyvinylidene fluoride), a silicone resin, a fluorosilicone resin, m-PPE (modified poly phenylene ether) resin, PET (polyethylene terephthalate), PBT (polybutylene terephthalate), or modified polyolefin.

An inner peripheral portion 25 of the resin frame member 24 (an inner peripheral portion 24an of the first frame shaped sheet 24a) is positioned between the outer peripheral portion 20c of the anode 20 and the outer peripheral portion 22c of the cathode 22. Specifically, the inner peripheral portion 25 of the resin frame member 24 is sandwiched between an outer peripheral portion 18c of the electrolyte membrane 18 and an outer peripheral portion 20c of the anode 20. The inner peripheral portion 25 of the resin frame member 24 and the outer peripheral portion 18c of the electrolyte membrane 18 are joined together through the adhesive layer 24c. It should be noted that the inner peripheral portion 25 of the resin frame member 24 may be sandwiched between the electrolyte membrane 18 and the cathode 22.

An inner end 25a of the resin frame member 24 (inner end of the first frame shaped sheet 24a) is narrowed inward. Therefore, the thickness of the inner end 25a (dimension in the direction indicated by the arrow A) is decreased inward. In the inner peripheral portion 25 of the resin frame member 24, the inner end 25a is a portion which forms the inner end of the resin frame member 24 and an area around the inner end of the resin frame member 24.

In the first embodiment, as shown in FIG. 2, in the state where the MEA 10a and the resin frame member 24 are joined together (after completion of production), the inner end 25a of the resin frame member 24 is inclined inward of the MEA 10a in a tapered manner that a surface 25a1 adjacent to the anode 20 (on a side opposite to the electrolyte membrane 18) gets closer to the electrolyte membrane 18. As described later, in the state before the inner end 25a is joined to the electrolyte membrane 18, the inner end 25a is narrowed inward in a manner that a surface 25a2 adjacent to the electrolyte membrane 18 gets closer to the surface 25a1 opposite to the electrolyte membrane 18 (see FIG. 3). Specifically, in the first embodiment, in the state before the inner end 25a is joined to the electrolyte membrane 18, the surface 25a2 of the inner end 25a is inclined inward of the MEA 10a in a tapered manner that the surface 25a2 of the inner end 25a gets remoter from the electrolyte membrane 18 (see FIG. 3). A tapered part of the inner end 25a in a narrowed shape is positioned inside the outer end 20e of the first electrode 20 and the outer end 22e of the second electrode 22.

The anode 20 includes a step at a position corresponding to the inner end 25a of the resin frame member 24. Specifically, the anode 20 includes an inclined area 21 inclined from the electrolyte membrane 18 along the inner end 25a, at a position overlapped with the inner end 25a of the resin frame member 24. Therefore, in the inclined area 21, the first electrode catalyst layer 20a and the first gas diffusion layer 20b are inclined from the electrolyte membrane 18. The anode 20 includes a portion which is outside the inclined area 21, and in parallel to the electrolyte membrane 18. The outer end 22e of the cathode 22 is positioned outside the inclined area 21.

In the anode 20, a surface adjacent to the first separator 14 in an area outside the inclined area 21 is positioned remotely from the electrolyte membrane 18, in comparison with a surface adjacent to the first separator 14 in an area inside the inclined area 21. No adhesive layer is provided between surfaces of the inner peripheral portion 25 of the resin frame member 24 and the first electrode catalyst layer 20a which face each other. That is, the inner peripheral portion 25 of the resin frame member 24 opposite to the electrolyte membrane 18 directly contacts the first electrode catalyst layer 20a (is not adhered to the first electrode catalyst layer 20a).

In contrast, the cathode 22 has a flat shape from an area outside the inner end 25a of the resin frame member 24 to an area inside the inner end 25a of the resin frame member 24. Therefore, an area of the cathode 22 (second electrode catalyst layer 22a and second gas diffusion layer 22b) which is overlapped with the inner end 25a is in parallel with the electrolyte membrane 18.

Instead of adopting the above structure, the anode 20 may have a flat shape from an area outside the inner end 25a of the resin frame member 24 to an area inside the inner end 25a of the resin frame member 24, and the cathode 22 may have an inclined area inclined from the electrolyte membrane 18 at a position overlapped with the inner end 25a of the resin frame member 24.

The second frame shaped sheet 24b is joined to an outer peripheral portion of the first frame shaped sheet 24a by the adhesive 24d. The thickness T2 of the second frame shaped sheet 24b is larger than the thickness T1 of the first frame shaped sheet 24a. An inner end 24be of the second frame shaped sheet 24b is positioned outside an inner end 24ae of the first frame shaped sheet 24a (in a direction away from the MEA 10a), and positioned outside the outer end 20e of the anode 20 and the outer end 22e of the cathode 22. A gap G is formed between the inner end 24be of the second frame shaped sheet 24b and the outer end 22e of the cathode 22. The gap G forms a part of a channel 36a described later.

The adhesive layer 24c is provided over an entire surface 24as of the first frame shaped sheet 24a on a side closer to the second frame shaped sheet 24b (cathode side). Therefore, the adhesive layer 24c is also provided at the inner end 25a. The adhesive layer 24c is provided continuously from a position between the first frame shaped sheet 24a and the second frame shaped sheet 24b to an area overlapped with the electrolyte membrane 18 and the inner end 25a. The first frame shaped sheet 24a is exposed to the gap G (channel 36a), through the adhesive layer 24c, at a position of the gap G. As the adhesive 24d of the adhesive layer 24c, for example, liquid sealant or hot melt adhesive is provided. The adhesive is not limited to liquid or solid adhesive, and not limited to thermoplastic or thermosetting adhesive, etc.

As shown in FIG. 1, at one end of the power generation cell 12 in the horizontal direction indicated by the arrow B, an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction indicated by the arrow A. The oxygen-containing gas is supplied through the oxygen-containing gas supply passage 30a, and the coolant is supplied through the coolant supply passage 32a. A fuel gas such as a hydrogen-containing gas is discharged through the fuel gas discharge passage 34b. The oxygen-containing gas supply passage 30a, the coolant supply passage 32a, and the fuel gas discharge passage 34b are arranged in the vertical direction indicated by the arrow C.

At the other end of the power generation cell 12 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction indicated by the arrow C.

The second separator 16 has an oxygen-containing gas flow field 36 on its surface 16a facing the resin frame equipped MEA 10. The oxygen-containing gas flow field 36 is connected to the oxygen-containing gas supply passage 30a and the oxygen-containing gas discharge passage 30b. Specifically, the oxygen-containing gas flow field 36 is formed between the second separator 16 and the resin frame equipped MEA 10. The oxygen-containing gas flow field 36 includes a plurality of straight flow grooves (or wavy flow grooves) extending in the direction indicated by the arrow B.

The first separator 14 has a fuel gas flow field 38 on its surface 14a facing the resin frame equipped MEA 10. The fuel gas flow field 38 is connected to the fuel gas supply passage 34a and the fuel gas discharge passage 34b. Specifically, the fuel gas flow field 38 is formed between the first separator 14 and the resin frame equipped MEA 10. The fuel gas flow field 38 includes straight flow grooves (or wavy flow grooves) extending in the direction indicated by the arrow B.

A coolant flow field 40 is formed between a surface 14b of the first separator 14 and a surface 16b of the second separator 16. The coolant flow field 40 is connected to the coolant supply passage 32a and the coolant discharge passage 32b. The coolant flow field 40 extends in the direction indicated by the arrow B.

As shown in FIG. 2, a plurality of ridges 39 forming a fuel gas flow field 38 are provided on the surface 14a of the first separator 14 (surface facing the resin frame equipped MEA 10). The ridges 39 protrude toward the anode 20, and contact the anode 20. A plurality of ridges 37 forming an oxygen-containing gas flow field 36 are provided on the surface 16a of the second separator 16 (surface facing the resin frame equipped MEA 10). The ridges 37 protrude toward the cathode 22, and contact the cathode 22. The MEA 10a is sandwiched between the ridges 37, 39.

A first seal line 42 (metal bead seal) is provided on the surface 14a of the first separator 14 around the outer peripheral portion of the first separator 14. The first seal line 42 is expanded toward the resin frame member 24, and contacts the first frame shaped sheet 24a (area overlapped with the second frame shaped sheet 24b) in an air tight and liquid tight manner. The first seal line 42 includes an outer bead 42a and an inner bead 42b provided inside the outer bead 42a.

The inner bead 42b is provided around the fuel gas flow field 38, the fuel gas supply passage 34a, and the fuel gas discharge passage 34b in a manner that the fuel gas flow field 38 is connected to the fuel gas supply passage 34a and the fuel gas discharge passage 34b. Each of the beads 42a, 42b is narrowed toward the front end (toward the resin frame member 24) in cross section. The front end of each of the beads 42a, 42b may have a flat shape (or a curved shape).

A channel 38a formed between the first separator 14 and the resin frame member 24 is connected to the fuel gas flow field 38 inside the first seal line 42 (on the MEA 10a v side). Therefore, the fuel gas is supplied to the channel 38a.

A second seal line 44 (metal bead seal) is provided on the surface 16a of the second separator 16 around the outer peripheral portion of the second separator 16. The second seal line 44 is expanded toward the resin frame member 24, and contacts the second frame shaped sheet 24b in an air tight and liquid tight manner. The first seal line 42 and the second seal line 44 face each other through the resin frame member 24. The resin frame member 24 is sandwiched between the first seal line 42 and the second seal line 44. The second seal line 44 includes an outer bead 44a, and an inner bead 44b provided inside the outer bead 44a.

The inner bead 44b is provided around the oxygen-containing gas flow field 36, the oxygen-containing gas supply passage 30a, and the oxygen-containing gas discharge passage 30b in a manner that the oxygen-containing gas flow field 36 is connected to the oxygen-containing gas supply passage 30a and the oxygen-containing gas discharge passage 30b. Each of the beads 44a, 44b is narrowed toward the front end (toward the resin frame member 24) in cross section. The front end of each of the beads 44a, 44b may have a flat shape (or a curved shape).

The channel 36a formed between the second separator 16 and the resin frame member 24, inside the second seal line 44 (adjacent to the MEA 10a) is connected to the oxygen-containing gas flow field 36. Therefore, the oxygen-containing gas is supplied to the channel 36a.

Operation of the fuel cell stack 11 including the power generation cell 12 having the above structure will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, oil is supplied to the coolant supply passage 32a.

Therefore, the oxygen-containing gas flows from the oxygen-containing gas supply passage 30a to the oxygen-containing gas flow field 36 of the second separator 16, and moves in the direction indicated by the arrow B, and the oxygen-containing gas is supplied to the cathode 22 of the MEA 10a. In the meanwhile, the fuel gas flows from the fuel gas supply passage 34a to the fuel gas flow field 38 of the first separator 14. The fuel gas moves along the fuel gas flow field 38 in the direction indicated by the arrow B, and the fuel gas is supplied to the anode 20 of the MEA 10a.

Thus, in the MEA 10a, the oxygen-containing gas supplied to the cathode 22, and the fuel gas supplied to the anode 20 are partially consumed in the second electrode catalyst layer 22a and the first electrode catalyst layer 20a by electrochemical reactions to generate electrical energy.

Then, in FIG. 1, the oxygen-containing gas supplied to, and partially consumed at the cathode 22 is discharged in the direction indicated by the arrow A along the oxygen-containing gas discharge passage 30b. Likewise, the fuel gas supplied to, and partially consumed at the anode 20 is discharged in the direction indicated by the arrow A along the fuel gas discharge passage 34b.

Further, the coolant supplied to the coolant supply passage 32a flows into the coolant flow field 40 between the first separator 14 and the second separator 16, and then, the coolant flows in the direction indicated by the arrow B. After the coolant cools the MEA 10a, the coolant is discharged through the coolant discharged passage 32b.

Next, a method of producing the resin frame equipped MEA 10 according to the first embodiment will be described below.

Firstly, the MEA 10a having the anode 20, the cathode 22 on both sides of the electrolyte membrane 18 is produced. Further, the resin frame member 24 is produced. The resin frame member 24 is not limited to structure where the first frame shaped sheet 24a and the second frame shaped sheet 24b are joined together through the adhesive layer 24c. The resin frame member 24 may be a member which is formed integrally as a whole. Further, the resin frame member 24 is not limited to a stepped shape including the relatively thin inner peripheral portion and the relatively thick outer peripheral portion. The resin frame member 24 may have a shape without any step from the inner peripheral portion to the outer peripheral portion (substantially flat shape).

Figure 3:
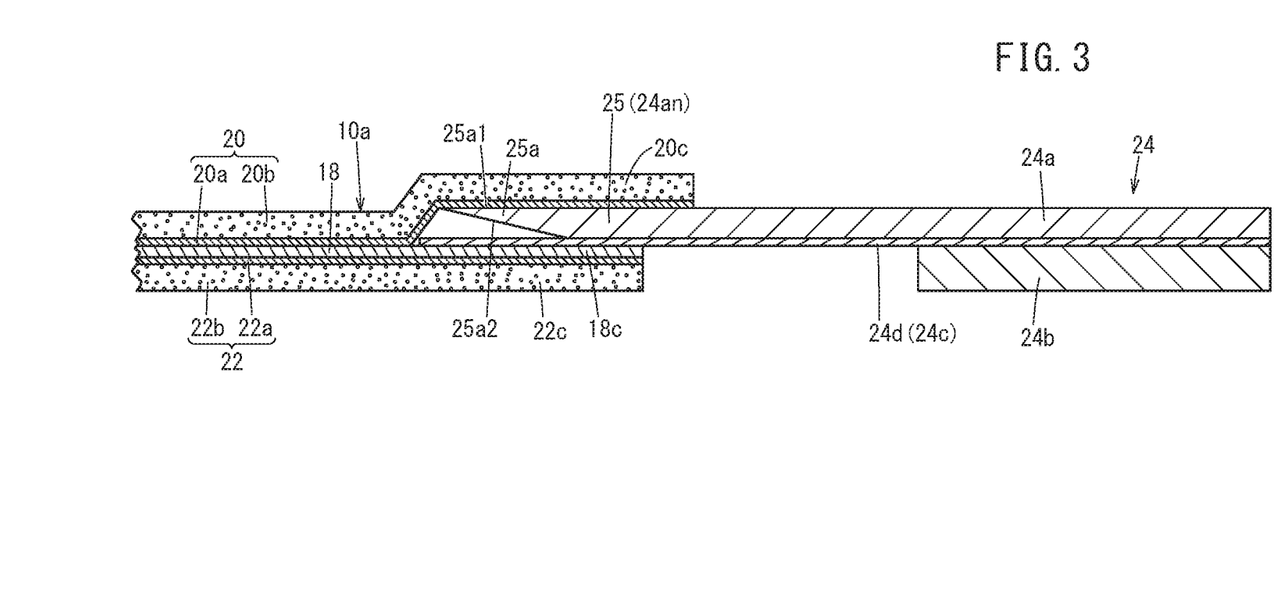
FIG. 3 is an explanatory view showing a step of placing components in a method of producing the resin frame equipped assembly according to a first embodiment of the preset invention.

Next, as shown in FIG. 3, a step of placing the inner end 25a of the resin frame member 24 between the outer peripheral portions 20c, 22c of the anode 20 and the cathode 22 is performed. In this case, the inner end 25a of the resin frame member 24 is narrowed inward in a manner that the surface 25a2 adjacent to the electrolyte membrane 18 gets closer to the surface 25a1 opposite to the electrolyte membrane 18. Specifically, in the placing step, the inner peripheral portion 25 (inner end 25a) of the resin frame member 24 is placed between the outer peripheral portion 20c of the anode 20 and the outer peripheral portion 18c of the electrolyte membrane 18. Further, in this case, a surface of the inner peripheral portion 25 of the resin frame member 24 where the adhesive 24d is provided is oriented toward the electrolyte membrane 18. At this stage, a tapered part of the inner end 25a in a narrowed shape is not joined to the electrolyte membrane 18.

Figure 4:
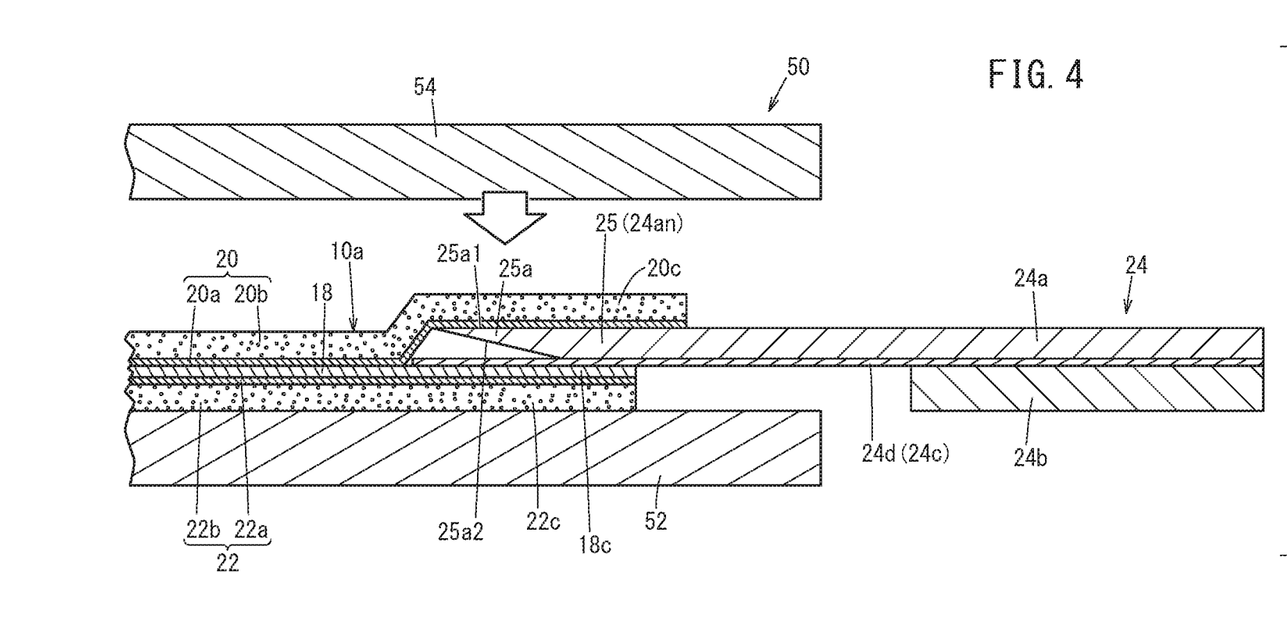
FIG. 4 is an explanatory view showing a step of joining components in the method of producing the resin frame equipped assembly according to the first embodiment of the preset invention.

Next, by applying heat and a load to the inner end 25a placed between the outer peripheral portions 20c, 22c of the anode 20 and the cathode 22, the inner end 25a and the electrolyte membrane 18 are joined together (joining step). Specifically, as shown in FIG. 4, a joining apparatus 50 holds the outer peripheral portions 20c, 22c of the anode 20 and the cathode 22 in the thickness direction to apply the heat and pressure to these components (hot pressing is performed). The joining apparatus 50 includes a base frame 52 (first joining jig) on which the MEA 10a is placed, and a movable die 54 (second joining jig) which is movable closer to, and away from the base frame 52.

In the state where the inner peripheral portion 25 of the resin frame member 24 is held between the anode 20 and the cathode 22, the MEA 10a is placed on the base frame 52 in a manner that the anode 20 is oriented upward (the cathode 22 is oriented downward). In the joining step, in the state the movable die 54 is heated to a predetermined temperature, the movable die 54 is lowered to apply heat and pressure to the outer peripheral portion of the MEA 10a and the inner peripheral portion 25 including the inner end 25a of the resin frame member 24.

In the structure, the adhesive 24d provided at the inner peripheral portion 25 of the resin frame member 24 is heated, and pressed by the movable die 54. As a result, the adhesive 24d is melted. In the meanwhile, the inner end 25a of the resin frame member 24 is heated by the movable die 54. As a result, the inner end 25a is softened. In this regard, the inner end 25a is narrowed inward in a manner that the surface 25a2 adjacent to the electrolyte membrane 18 gets closer to the surface 25a1 opposite to the electrolyte membrane 18. In the structure, by the pressure applied by the movable die 54, the inner end 25a is deformed toward the electrolyte membrane 18. Therefore, the adhesive 24d provided at the inner end 25a is melted as well.

Then, when heating and pressing by the joining apparatus 50 are finished, the adhesive 24d is solidified to form the adhesive layer 24c. As a result, as shown in FIG. 2, the resin frame equipped MEA 10 is obtained by joining the inner peripheral portion 25 of the resin frame member 24 and the outer peripheral portion 18c of the electrolyte membrane 18 through the adhesive layer 24c. In the resin frame equipped MEA 10, by deformation of the inner end 25a in the above joining step, the surface 25a1 of the inner end 25a adjacent to the anode 20 is inclined. That is, at the time of the joining step, the surface 25a1 of the inner end 25a adjacent to the anode 20 is deformed to become an inclined surface which is inclined inward in a tapered manner to get closer to the electrolyte membrane 18. Further, at the time of the joining step, at the portion of the anode 20 which is overlapped with the inclined surface (surface 25a1 of the inner end 2a), an inclined area 21 inclined along the inclined surface is formed.

In the first embodiment, the inner end 25a of the resin frame member 24 is narrowed inward in a manner that, in the state before the inner end 25a of the resin frame member 24 is joined to the electrolyte membrane 18 (FIG. 3), the surface 25a2 adjacent to the electrolyte membrane 18 gets closer to the surface 25a1 opposite to the electrolyte membrane 18 (the surface 25a2 of the inner end 25a is inclined in a tapered manner). In the structure, even if the surface pressure is applied at the time of applying a load for joining the components together, the inner end 25a of the resin frame member 24 is not stuck into the electrolyte membrane 18. Therefore, at the time of joining the MEA 10a and the resin frame member 24 together, it is possible to suppress damage of the electrolyte membrane 18 by the inner end 25a of the resin frame member 24 as much as possible.

Unlike the first embodiment, it may be considered to suppress the damage of the electrolyte membrane 18 due to sticking at the time of applying a load, by providing clearance (recess) in the joining jig (joining apparatus 50) at a position corresponding to the inner end 25a, instead of adopting the inner end 25a in a narrowed shape. However, in such a method, the surface pressure may not be applied to the outer end of the power generation area of the MEA 10a, and thus, the effective area of the power generation area may be decreased. In order to ensure that the power generation area has a desired effective area, the power generation area needs to be designed taking the possible reduction of the effective area into consideration. Further, since the clearance is provided, the joining jig has complicated structure.

In contrast, in the first embodiment, the inner end 25a of the resin frame member 24 is narrowed. Thus, without providing the clearance for the joining jig, it becomes possible to suppress the damage of the electrolyte membrane 18 due to sticking when the load is applied. Therefore, at the time of designing the size of the power generation area of the MEA 10a, it is sufficient to design the power generation area to have the minimum required size, and in comparison with the case where the clearance is provided, it is possible to simplify the structure of the joining jig.

A resin frame equipped membrane electrode assembly 100 according to a second embodiment of the present invention (hereinafter referred to as the "resin frame equipped MEA 100") shown in FIG. 5 includes an MEA 10a, and a resin frame member 102 which is joined to an outer peripheral portion of the MEA 10a and provided around the outer peripheral portion of the MEA 10a.

Figure 5:
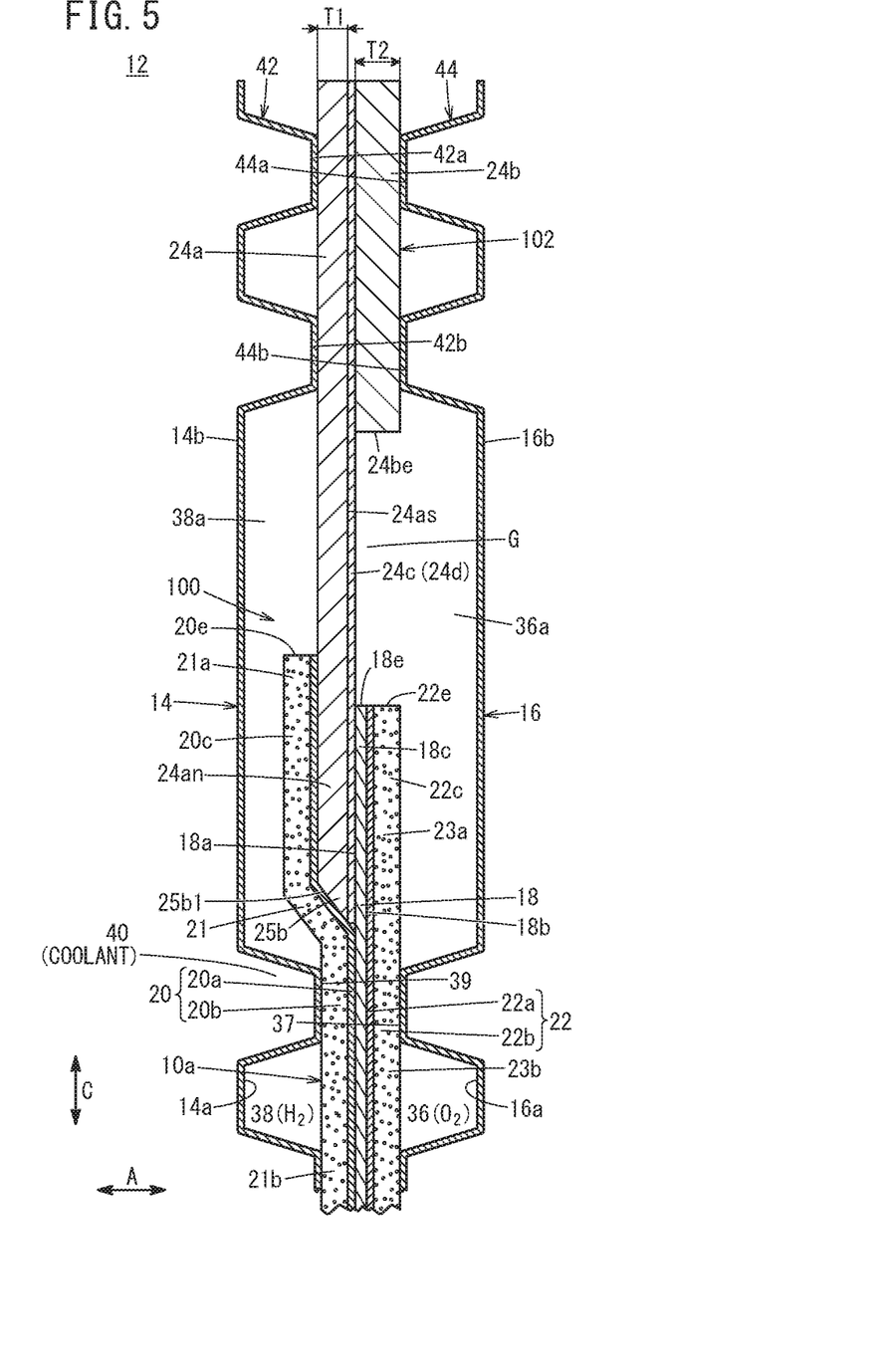
FIG. 5 is a cross sectional view showing main components of a power generation cell including a resin frame equipped membrane electrode assembly according to a second embodiment of the present invention.

In the second embodiment, as shown in FIG. 5, in the state where the MEA 10a and the resin frame member 102 are joined together (after completion of production), an inner end 25b of the resin frame member 102 is inclined inward of the MEA 10a in a tapered manner that a surface 25b1 of the inner end 25b adjacent to the anode 20 (opposite to the electrolyte membrane 18) gets closer to the electrolyte membrane 18.

Figure 6:
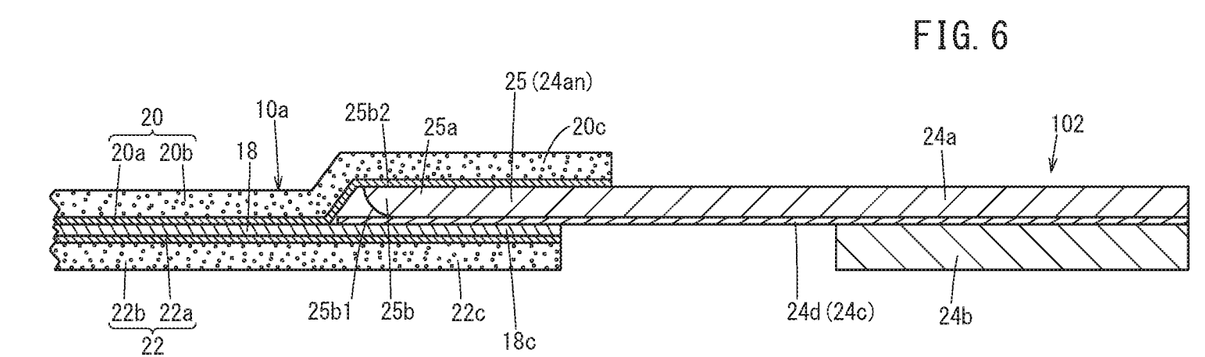
FIG. 6 is an explanatory view showing a step of placing components in a method of producing the resin frame equipped assembly according to the second embodiment of the preset invention.

Further, in the state before the inner end 25b of the resin frame member 102 is joined to the electrolyte membrane 18, the inner end 25b is narrowed inward in a manner that a surface 25b2 of the inner end 25b adjacent to the electrolyte membrane 18 gets closer to the surface 25b1 of the inner end 25b adjacent to the electrolyte membrane 18 (see FIG. 6). Specifically, in the second embodiment, in the state before the inner end 25b and the electrolyte membrane 18 are joined together, the surface 25b2 of the inner end 25b has a curved shape (R shape) which is curved inward of the MEA 10a, away from the electrolyte membrane 18 (see FIG. 6).

In other respects, the resin frame equipped MEA 100 according to the second embodiment has the same structure as the resin frame equipped MEA 10 according to the first embodiment.

Next, a method of producing the resin frame equipped MEA 100 according to the second embodiment will be described below.

Firstly, the MEA 10a having the anode 20 and the cathode 22 on both sides of the electrolyte membrane 18 is produced. Then, the resin frame member 102 is produced. Next, as shown in FIG. 6, a step of placing the inner end 25b of the resin frame member 102 between the outer peripheral portions 20c, 22c of the anode 20 and the cathode 22 is performed. In this case, the inner end 25b of the resin frame member 102 is narrowed inward in a manner that the surface 25b2 adjacent to the electrolyte membrane 18 gets closer to the surface 25b1 opposite to the electrolyte membrane 18.

Figure 7:
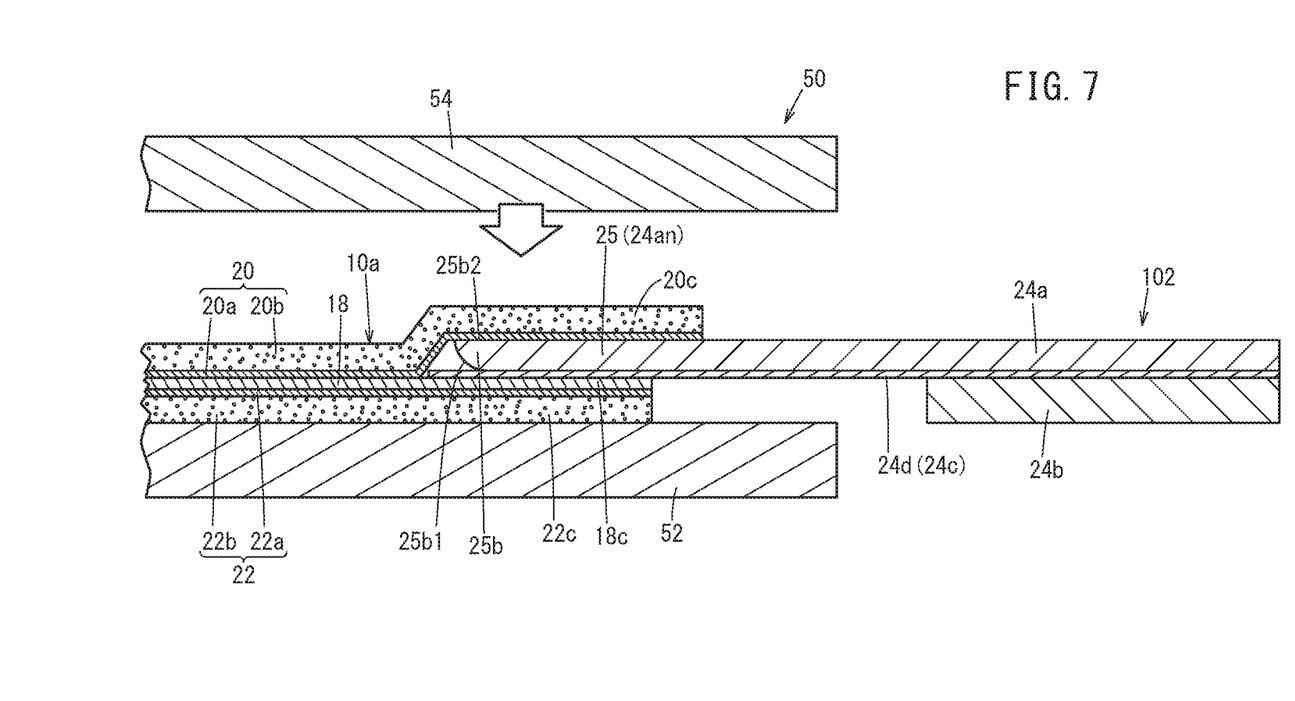
FIG. 7 is an explanatory view showing a step of joining components in the method of producing the resin frame equipped assembly according to the second embodiment of the preset invention.

Next, as in the case of the joining step according to the first embodiment (FIG. 4), as shown in FIG. 7, using the joining apparatus 50, a step of joining the inner end 25b and the electrolyte membrane 18 is performed by applying heat and a load to the inner end 25b placed between the outer peripheral portions 20c, 22c of the anode 20 and the cathode 22.

In the joining step, the adhesive 24d provided at the inner peripheral portion 25 of the resin frame member 102 is heated, and pressed by the movable die 54. As a result, the adhesive 24d is melted. Further, the inner end 25b is deformed toward the electrolyte membrane 18. Therefore, the adhesive 24d provided at the inner end 25b is melted as well. Then, when heating and pressing by the joining apparatus 50 are finished, the adhesive 24d is solidified to form the adhesive layer 24c.

As a result, as shown in FIG. 5, the resin frame equipped MEA 100 is obtained by joining the inner peripheral portion 25 of the resin frame member 102 and the outer peripheral portion 18c of the electrolyte membrane 18 through the adhesive layer 24c. In the resin frame equipped MEA 100, by deformation of the inner end 25b in the above described joining step, the surface 25b1 of the inner end 25b adjacent to the anode 20 is inclined.

In other respect, the method of producing the resin frame equipped MEA 100 according to the second embodiment is the same as the method of producing the resin frame equipped MEA 10 according to the first embodiment.

In the second embodiment, in the state before the inner end 25b of the resin frame member 102 is joined to the electrolyte membrane 18, the inner end 25b is narrowed inward in a manner that the surface 25b2 adjacent to the electrolyte membrane 18 gets closer to the surface 25b1 opposite to the electrolyte membrane 18 (the surface 25b2 of the inner end 25b is a curved surface). Therefore, the same advantages as in the case of the first embodiment are obtained. For example, even if the surface pressure is applied at the time of applying a load, sticking of the inner end 25b of the resin frame member 102 into the electrolyte membrane is suppressed.

The present invention is not limited to the above embodiments. Various modifications can be made without departing from the gist of the present invention.

What is claimed is:

1. A method of producing a resin frame equipped membrane electrode assembly, the resin frame equipped membrane electrode assembly comprising:

a membrane electrode assembly including a first electrode on one surface of an electrolyte membrane, and a second electrode on another surface of the electrolyte membrane; and a resin frame member provided on and around an outer peripheral portion of the membrane electrode assembly, the method comprising the steps of:

placing an inner end of the resin frame member between an outer peripheral portion of the first electrode and an outer peripheral portion of the second electrode, the inner end being narrowed inward in a manner that a surface of the inner end adjacent to the electrolyte membrane gets closer to a surface of the inner end opposite to the electrolyte membrane; and joining the inner end and the electrolyte membrane together, by applying heat and a load to the inner end placed between the outer peripheral portion of the first electrode and the outer peripheral portion of the second electrode;

wherein after the placing step, and before the joining step, a tapered part of the inner end in a narrowed shape is not joined to the electrolyte membrane; and at time of the joining step, the tapered part is deformed toward the electrolyte membrane, and joined to the electrolyte membrane.

2. The method of producing the resin frame equipped membrane electrode assembly according to claim 1, wherein in the joining step, the inner end is joined to the electrolyte membrane through an adhesive layer.

3. The method of producing the resin frame equipped membrane electrode assembly according to claim 2, wherein in the first electrode and the second electrode, a surface size of one electrode is larger than a surface size of another electrode; and in the joining step, the inner end is joined to the electrolyte membrane which is integral with the other electrode, through the adhesive layer.

4. The method of producing the resin frame equipped membrane electrode assembly according to claim 3, wherein in a state where the joining step is finished, the one electrode has an inclined area inclined from the electrolyte membrane at a position overlapped with the inner end of the resin frame member; and the other electrode has a flat shape from an area outside the inner end to an area inside the inner end.

5. The method of producing the resin frame equipped membrane electrode assembly according to claim 1, wherein at the time of the joining step, a surface of the tapered part adjacent to the first electrode is deformed to have an inclined surface inclined inward in a tapered manner to get closer to the electrolyte membrane.

6. The method of producing the resin frame equipped membrane electrode assembly according to claim 5, wherein at the time of the joining step, an inclined area inclined along the inclined surface is formed at a position of the first electrode overlapped with the inclined surface.

* * * * *